US011745543B2

(12) United States Patent
Liu et al.

(10) Patent No.: US 11,745,543 B2
(45) Date of Patent: Sep. 5, 2023

(54) NON-PNEUMATIC TIRE

(71) Applicant: CITIC DICASTAL CO., LTD., Hebei Province (CN)

(72) Inventors: Weidong Liu, Hebei Province (CN); Shiwen Xu, Hebei Province (CN); Zuo Xu, Hebei Province (CN); Minglei Li, Hebei Province (CN); Hanqi Wu, Hebei Province (CN); Guoyuan Xiong, Hebei Province (CN)

(73) Assignee: CITIC DICASTAL CO., LTD., Qinhuangdao (CN)

( * ) Notice: Subject to any disclaimer, the term of this patent is extended or adjusted under 35 U.S.C. 154(b) by 163 days.

(21) Appl. No.: 17/410,715

(22) Filed: Aug. 24, 2021

(65) Prior Publication Data
US 2022/0355620 A1    Nov. 10, 2022

(30) Foreign Application Priority Data
May 10, 2021   (CN) .......................... 202110503486.0

(51) Int. Cl.
*B60C 7/14* (2006.01)
*B60B 9/04* (2006.01)
*B60B 9/26* (2006.01)

(52) U.S. Cl.
CPC ................ *B60C 7/146* (2021.08); *B60B 9/04* (2013.01); *B60B 9/26* (2013.01)

(58) Field of Classification Search
CPC .. B60C 7/146; B60C 7/18; B60C 7/24; B60B 9/04; B60B 9/26
See application file for complete search history.

(56) References Cited

U.S. PATENT DOCUMENTS

| | | | | |
|---|---|---|---|---|
| 943,563 | A * | 12/1909 | Peck ......................... | B60B 9/06 |
| | | | | 152/100 |
| 1,349,019 | A * | 8/1920 | Timberlake ............... | B60B 9/26 |
| | | | | 152/80 |
| 4,553,577 | A * | 11/1985 | Gregg ....................... | B60B 9/26 |
| | | | | 152/80 |
| 2011/0126948 | A1 * | 6/2011 | Boyer ....................... | B60B 9/04 |
| | | | | 152/76 |
| 2019/0001598 | A1 * | 1/2019 | Delfino ..................... | B60B 9/26 |
| 2019/0001745 | A1 * | 1/2019 | Delfino ..................... | B60C 7/14 |
| 2020/0039293 | A1 * | 2/2020 | Cron ........................ | B60C 7/146 |
| 2020/0324573 | A1 * | 10/2020 | Tardiff ..................... | B60B 9/04 |

FOREIGN PATENT DOCUMENTS

DE         20000034 U1 *  4/2000  ............. A63C 17/22

* cited by examiner

*Primary Examiner* — Kip T Kotter
(74) *Attorney, Agent, or Firm* — IPRO, PLLC

(57) ABSTRACT

The invention discloses a non-pneumatic tire, comprising a wheel hub; an annular belt located on the periphery of the wheel hub; spokes comprising a plurality of spokes circumferentially arranged between the annular belt and the wheel hub; each spoke being V-shaped, and the spoke comprising two inclined plates arranged at an angle and an arc-shaped apex corner area formed at the joint of the two inclined plates; a resistance part for limiting the deformation amount of the apex corner area to a deformation amount corresponding to the yield strength. According to the invention, plastic permanent deformation of spokes can be effectively avoided by adding resistance parts, and further the service life of non-pneumatic tires can be prolonged.

5 Claims, 10 Drawing Sheets

NON-PNEUMATIC TIRE

CROSS REFERENCE TO RELATED APPLICATIONS

This patent application claims the benefit of Chinese Patent Application with Ser. No. 2021105034860 filed on May 10, 2021, which is incorporated by reference herein.

TECHNICAL FIELD

The invention relates to a non-pneumatic tire.

BACKGROUND

The difference between non-pneumatic tires and pneumatic tires is that pneumatic tires are cushioned by the compressibility and fluidity of the gas in the tires and the elastic deformation of the carcass, while non-pneumatic tires are cushioned by the elastic deformation of elastic structures or elastic parts.

Various structures of non-pneumatic tires have emerged in the prior art, the non-pneumatic tire of one structure comprises: an annular belt, a wheel hub located on the radial inner side of the annular belt, and a plurality of circumferentially arranged spokes between the annular belt and the wheel hub. The outer surface of the annular belt is used for contacting with the road surface. The function of the spokes is to support the weight of the moving vehicle on the one hand, and to relieve the impact through elastic deformation when the tire encounters the impact on the other hand.

In order to make the relationship between the radial deformation of the contact area of the tire and the resistance generated by the tire in this area closer to a definite functional relationship when the tire encounters an impact, so that by setting the parameters of the physical properties of the tire in actual use at the design stage, in the prior art, the spokes are set in a V-shape, and the apex corners of the V-shaped spokes are set in an arc shape, so that the spokes are buffered only by deforming the apex corner area (other areas do not deform). It can be said that this arrangement can indeed make the relationship between deformation amount and resistance more constant.

However, the above-mentioned structure of spokes brings the following defects to non-pneumatic tires:

When the tire encounters a great impact, for example, a moving vehicle in motion falls to the ground over such a large height span that the tire encounters a great vertical upward impact from the ground, the tire of the above structure cushions the impact by deforming the spokes. With the above-mentioned structure based on the spokes, deformation of the spokes actually occurs only in the apex corner area. On the whole, the angle between the two inclined plates of the spoke becomes smaller. However, the above-mentioned great impact tends to cause the stress in the apex corner area to exceed the yield strength due to excessive deformation, thereby causing plastic deformation in this area. Moreover, the apex corner area corresponds to a fulcrum of the spokes, because the angle between the two inclined plates will decrease with the increase of the deformation in the apex corner area. However, the decrease of the included angle increases the force arm formed by the vertical distance from the impact force acting on the inclined plate to the apex corner area, and the increase of the force arm increases the speed of plastic deformation. Understandably, if plastic deformation occurs in the apex corner area, the spokes will be permanently deformed, and the permanent change of the spokes indicates tire damage.

SUMMARY

In view of the above technical problems in the prior art, the embodiments of the present invention provide a non-pneumatic tire.

In order to solve the above technical problems, the technical solution adopted by the embodiment of the invention is as follows:

A non-pneumatic tire comprising:
a wheel hub;
an annular belt, located on the periphery of the wheel hub;
spokes, comprising a plurality of spokes circumferentially arranged between the annular belt and the wheel hub; each spoke being V-shaped, and the spoke comprising two inclined plates arranged at an angle and an arc-shaped apex corner area formed at the joint of the two inclined plates;
a resistance part for limiting the deformation amount of the apex corner area to a deformation amount corresponding to the yield strength.

Preferably, the resistance part is located between the two inclined plates; the resistance part is used for applying reaction force to the two inclined plates when the included angle of the two inclined plates is smaller than the preset included angle.

Preferably, the resistance part comprises a tile-like body having an arc-shaped to surface and a connection portion integrally formed with the tile-like body, the end part of the connection portion away from the tile-shaped body has an arc-shaped surface matched with the inner side of the apex corner area, and the end part of the connection portion is attached to the inner side of the apex corner area and connected to the apex corner area by a fastener passing through the arc part; wherein:
the arc-shaped surface of the tile-shaped body faces the two inclined plates, and the connection portion makes the tile-shaped body away from the apex corner area;
when the included angle of the two inclined plates becomes smaller than the preset included angle, the position of the two inclined plates away from the apex corner area contacts the arc-shaped surface of the tile-shaped body, so that the tile-shaped body exerts a reaction force on the two inclined plates.

Preferably, a rubber layer is attached to the end of the connection portion of the resistance part.

Preferably, the resistance part includes a V-shaped bent plate and a plurality of sliders formed at both ends of the bent plate and arranged in width; the two inclined plates of the spoke are provided with sliding grooves penetrating through the thickness, and the sliders penetrate through the sliding grooves; wherein:
when the included angle of the two inclined plates of the spoke becomes smaller than the preset included angle, the two inclined plates contact with the bent plates so that the bent plates apply a reaction force to the two inclined plates.

Preferably, the ends of the spokes are connected to the annular belt and the wheel hub by means of an embedding part; wherein:
a strip body with a circular cross section is formed at the end of the spoke, the embedding part is provided with a guide groove with a circular cross section, and the strip extends into the guide groove from the end of the guide groove so that the spoke can rotate relative to the embedding part, and the embedding part is fixed to the annular belt and the wheel hub by means of a fastener.

Preferably, the end of the slider is provided with a limiting part, and the limiting part is used to restrict the slider from disengaging from the sliding groove of the inclined plate.

Compared with the prior art, the beneficial effects of the non-pneumatic tire provided by the present invention are that:

according to the invention, plastic permanent deformation of spokes can be effectively avoided by adding resistance parts, and further the service life of non-pneumatic tires can be prolonged.

A summary of various implementations or examples of the techniques described in the present invention is not a complete disclosure of the full scope or all features of the disclosed techniques.

REFERENCE NUMERAL

Figure 1:
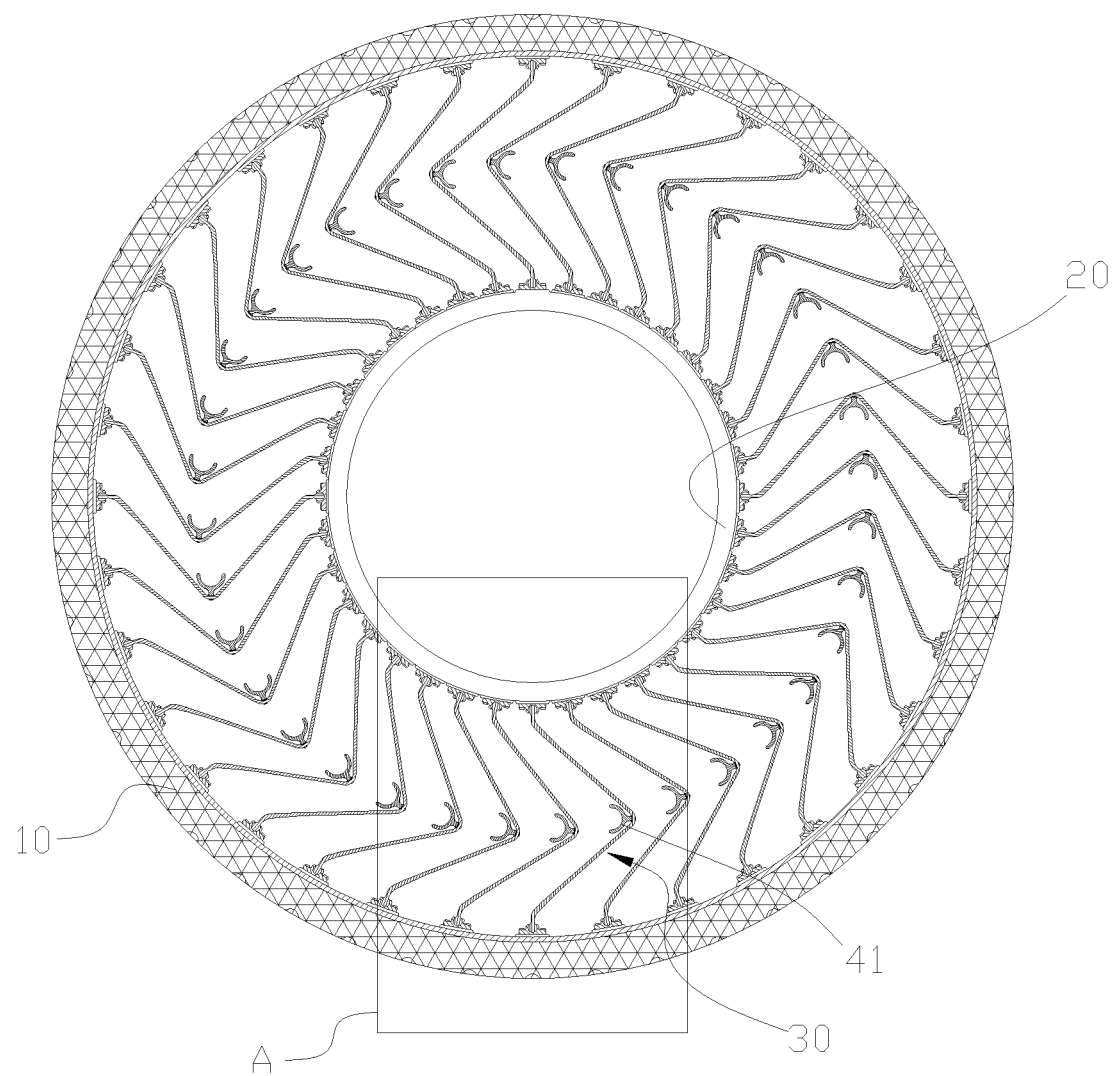
FIG. 1 is a schematic structural diagram of a non-pneumatic tire according to Embodiment 1 of the present invention (in the case where the tire is less impacted by the ground).
Figure 2:
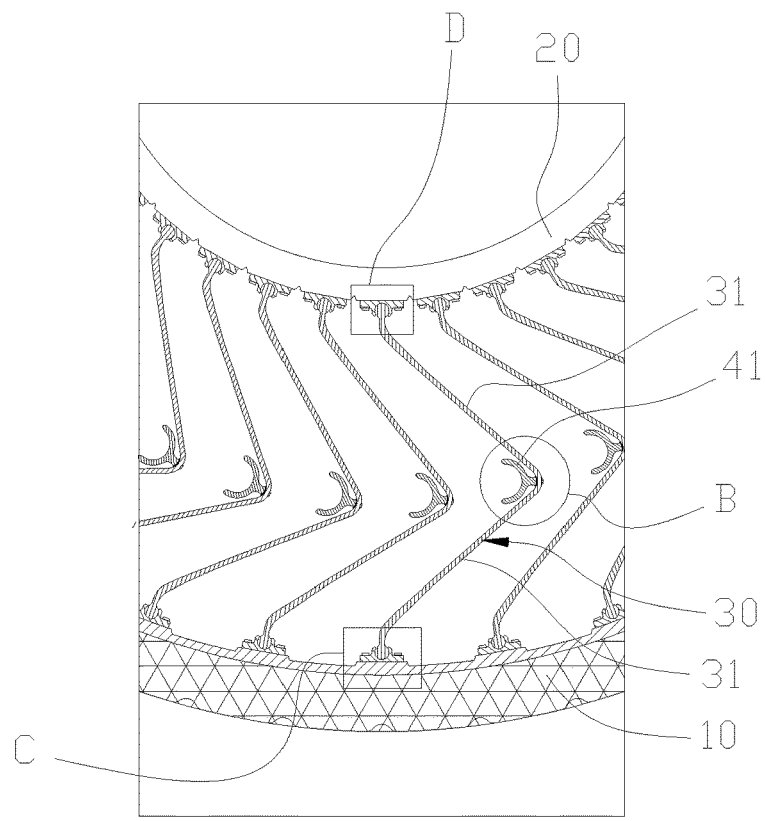
FIG. 2 is an enlarged view of part A of FIG. 1.
Figure 3:
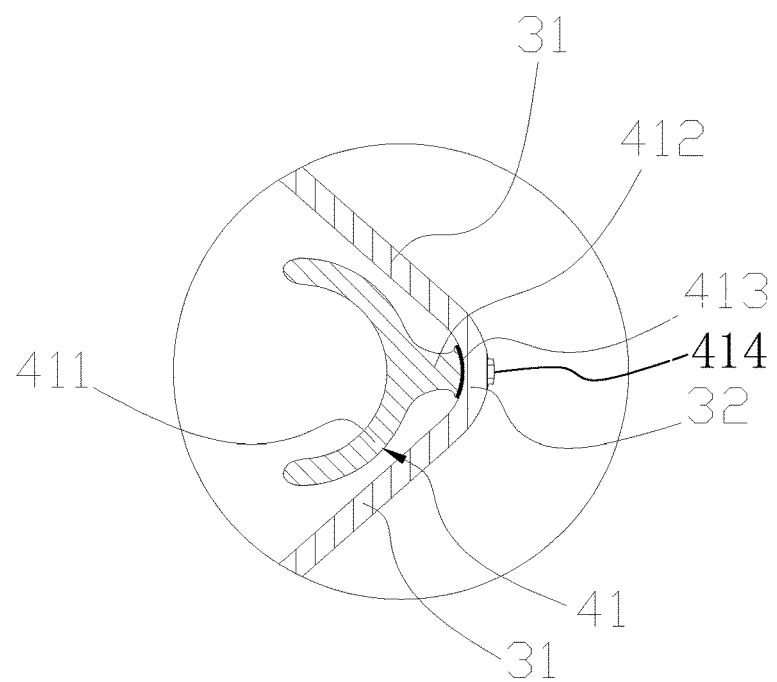
FIG. 3 is an enlarged view of part B of FIG. 2.
Figure 4:
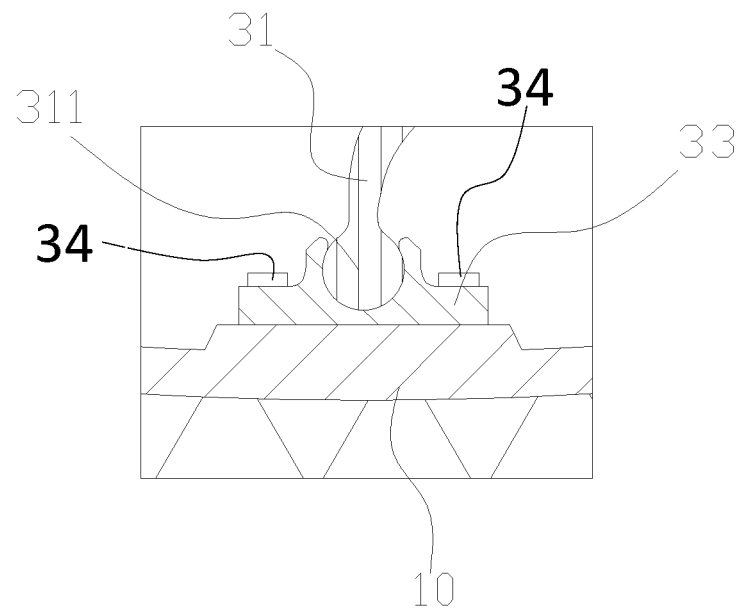
FIG. 4 is an enlarged view of part C of FIG. 2.
Figure 5:
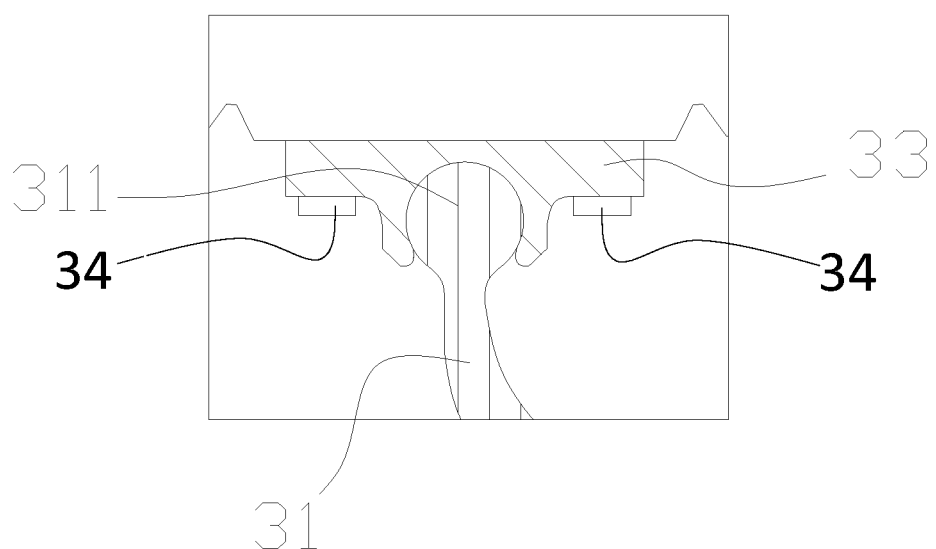
FIG. 5 is an enlarged view of part D of FIG. 2.
Figure 6:
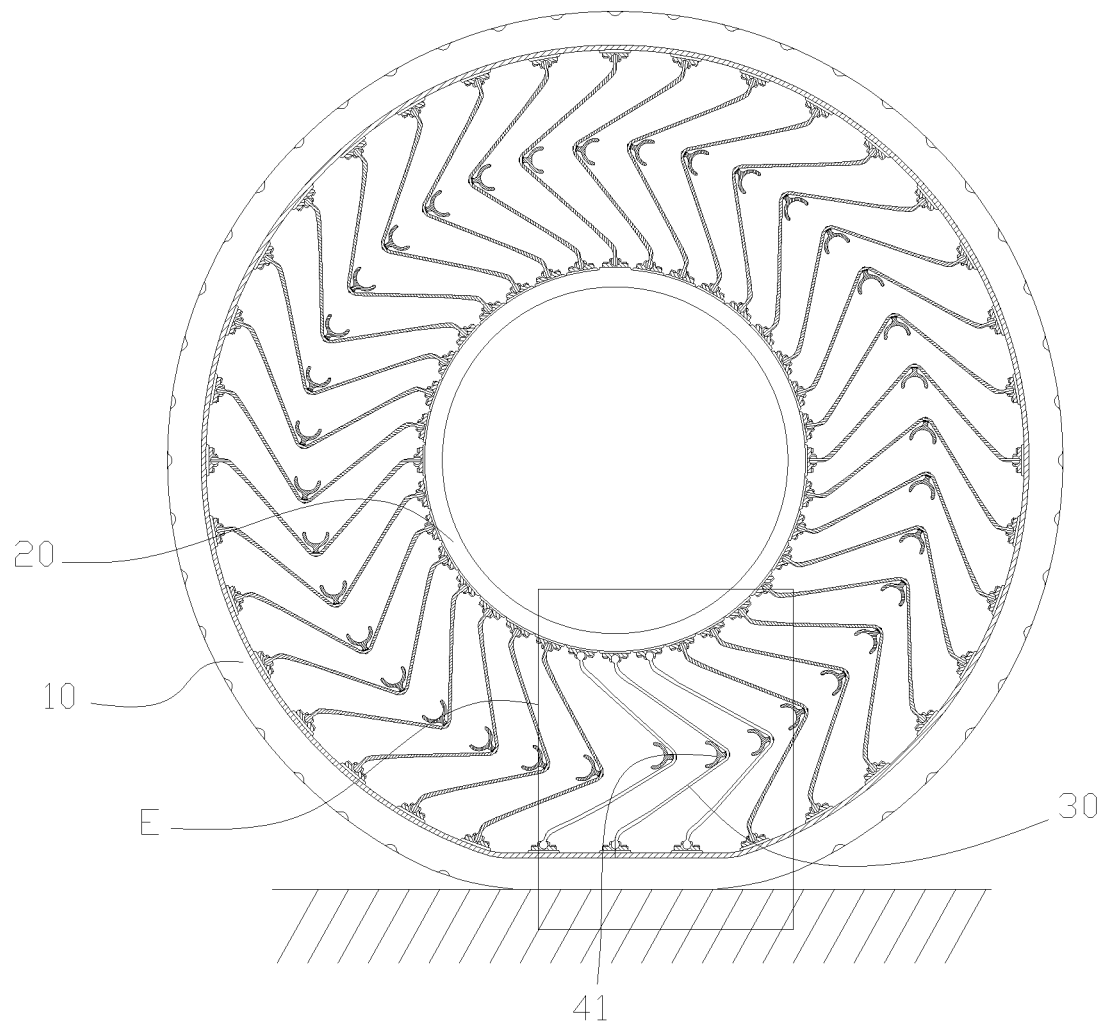
FIG. 6 is a structural diagram of a non-pneumatic tire according to Embodiment 1 of the present invention (in the case where the tire is greatly impacted by the ground).
Figure 7:
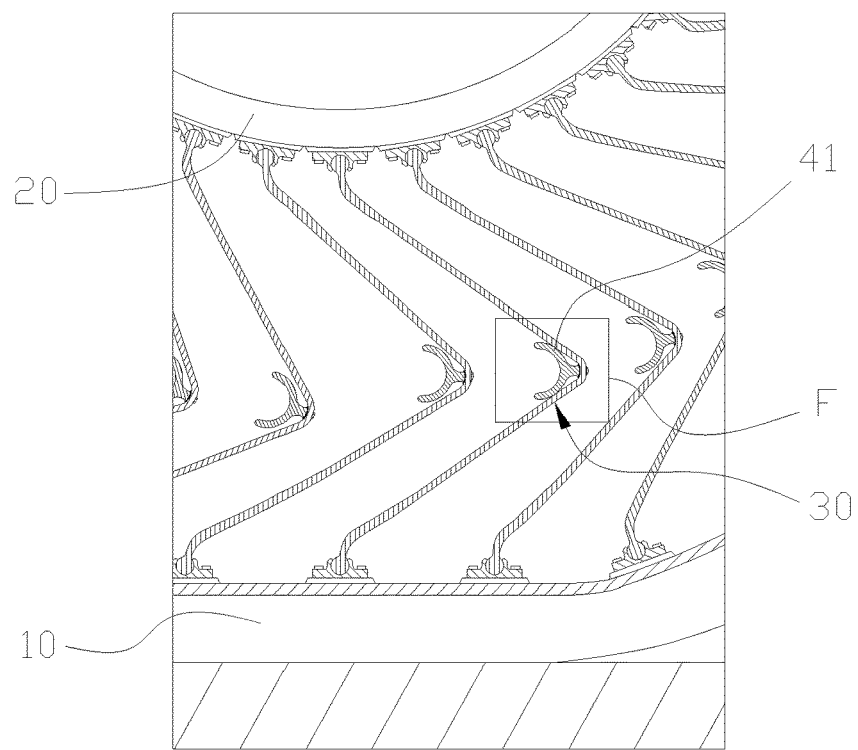
FIG. 7 is an enlarged view of part E of FIG. 6.

10—annular band; 20—wheel hub; 30—spoke; 31—inclined plate; 31'—inclined plate; 311—strip body; 312—guide slot; 32—apex corner area; 32'—apex corner area; 33—embedding part; 34—fastener; 41—resistance part; 411—tile-shaped body; 412—connection portion; 413—rubber layer; 414—fastener; 42—resistance part; 421—slider; 422—limit part.

DETAILED DESCRIPTION OF THE EMBODIMENTS

In order to keep the following description of embodiments of the present invention clear and concise, the detailed description of known functions and known parts of the present invention has been omitted.

As shown in FIGS. 1-13, an embodiment of the present disclosure discloses a non-pneumatic tire including a wheel hub 20, an annular belt 10, a plurality of spokes 30, and resistance parts 41, 42.

The wheel hub 20 is made of a metal material, for example, the wheel hub 20 is made of an aluminum alloy material. The wheel hub 20 is used to be connected to a rotating shaft of a mobile vehicle. The rotating shaft is driven by a driving system to drive the wheel hub 20 to rotate so that the entire tire rotates for the mobile vehicle to travel.

The annular belt 10 is located at the periphery of the wheel hub 20. The annular belt 10 is made of a rubber material and a composite wire. The annular belt 10 corresponds to the carcass of a pneumatic tire. In the present invention, the annular belt 10 has an outer layer with a small elastic modulus and an inner layer with a large elastic modulus. The outer layer is used for contacting the ground.

A plurality of spokes 30 are arranged circumferentially between the wheel hub 20 and the inner layer of the annular belt 10, that is, both ends of the spokes 30 are connected to the wheel hub 20 and the inner layer of the annular belt 10, respectively, and the spokes 30 are placed in a compressed state. In this way, the wheel hub 20 forms a certain stiffness of the entire tire and relieves the impact by deformation when the tire encounters the impact.

In the present invention, each spoke 30 is V-shaped, spokes 30 are made of spring steel. In particular, each spoke 30 includes two inclined plates 31 or 31' arranged at an angle and an arc-shaped apex corner area 32 or 32' formed at a joint of the two inclined plates 31 or 31'. And in order for the two inclined plates 31 or 31' to be larger than a preset angle, the elastic deformation of the spokes 30 occurs only in the apex corner area 32 or 32', and the adjustment process is performed at the apex corner area 32 or 32' so that the elastic modulus of the main body portion of the inclined plate 31 or 31' is greater than the elastic modulus of the apex corner area 32 or 32'. This makes the deformation completely only occur in the apex corner area 32 or 32' when the inclined plate 31 or 31' is deformed at a predetermined angle.

Each spoke 30 is equipped with a resistance part 41, 42 for limiting the included angle of the two inclined plates 31 or 31' of the spoke 30 to be smaller than a preset included angle when deformed.

It should be noted that: the angle between the two inclined plates 31 or 31' indicates the amount of deformation of the apex corner area 32 or 32', that is, the smaller the included angle between the two inclined plates 31 or 31', the larger the deformation amount of the apex corner area 32 or 32'. Therefore, the preset included angle is set based on the deformation amount of the apex corner area 32 or 32'. The setting rule is that the included angle between the two inclined plates 31 or 31' when the apex corner area 32 or 32' just yields is the limit included angle C, so that the preset included angle is smaller than the limit included angle C.

Based on the above discussion, it can be seen that the resistance parts 41, 42 actually prevent the apex corner area 32 or 32' from yielding by limiting the included angle between the two inclined plates 31 or 31' to be smaller than the preset included angle, thereby preventing the area from undergoing plastic permanent deformation.

In some preferred embodiments, the spoke 30 is preferably connected to the wheel hub 20 and the inner side of the annular belt 10. In particular, when processing the spokes 30, a strip 311 having a circular cross-section is formed at the end of the inclined plate 31 or 31', an embedding part 33 is fixed to the outside of the wheel hub 20 and the inside of the annular belt 10 by a fastener 34, the embedding part 33 is provided with a guide groove 312 having a circular cross-section, the guide groove 312 penetrates through the embedding part 33 in the thickness direction of the tire, and the strip shape of the end portion of the inclined plate 31' extends into the guide groove 312 from a section of the guide groove 312. Thus, the inclined plate 31 or 31' is connected to the wheel hub 20 and the annular belt 10 with the engagement of the strip body 311 and the embedding part 33, and the inclined plate 31 or 31' can freely rotate around the embedding part 33 at a certain angle. The advantages of this structure are: when the tire is impacted and the spoke 30 is deformed by the change of the included angle of the two inclined plates 31 or 31' to alleviate the impact, the connection area of the inclined plate 31 or 31' with the wheel hub 20 and the annular belt 10 does not generate additional torque. This makes the stress and deformation of the spokes 30 very simple, which not only facilitates the tire to more accurately analyze the relationship between the included angle of the inclined plate 31 or 31' and the radial resistance in the design stage, but also effectively avoids the deformation difference of different spokes 30 caused by manufacturing, installation and process errors.

Two types of resistance parts 41, 42 are described below.

Embodiment 1

As shown in FIG. 1 to FIG. 8, In this embodiment, the resistance part 41 is located between the two inclined plates 31 of the spoke 30, the resistance part 41 includes an integrally formed tile-shaped body 411 and a connection portion 412, the tile-shaped body 411 has an arc-shaped surface, the connection portion 412 is connected to the tile-shaped body 411, an end portion of the connection portion 412 is formed with an arc-shaped surface, the arc-shaped surface matches the arc-shaped surface of the inner side of the apex corner area 32 of the spoke 30, a rubber layer 413 is coated on the curved surface of the end of the connection portion 412, the end of the connection portion 412 is attached to the inner side of the apex corner area 32 and fixed by means of a fastener 414 penetrating from the outside. The connection portion 412 has a certain length so that the curved surface of the tile-shaped body 411 is opposite to the position of the inclined plate 31 away from the apex corner area 32. And the relative positional relationship between the tile-shaped body 411 and the spoke 30 is arranged such that when the included angle of the two inclined plates 31 of the spoke 30 is reduced to a preset included angle, the position of the inclined plate 31 away from the apex corner area 32 starts to contact the arc-shaped surface of the tile-shaped body 411, and therefore, the tile-shaped body 411 produces resistance to the two inclined plates 31 to prevent the included angle of the two inclined plates 31 from further decreasing.

Figure 8:
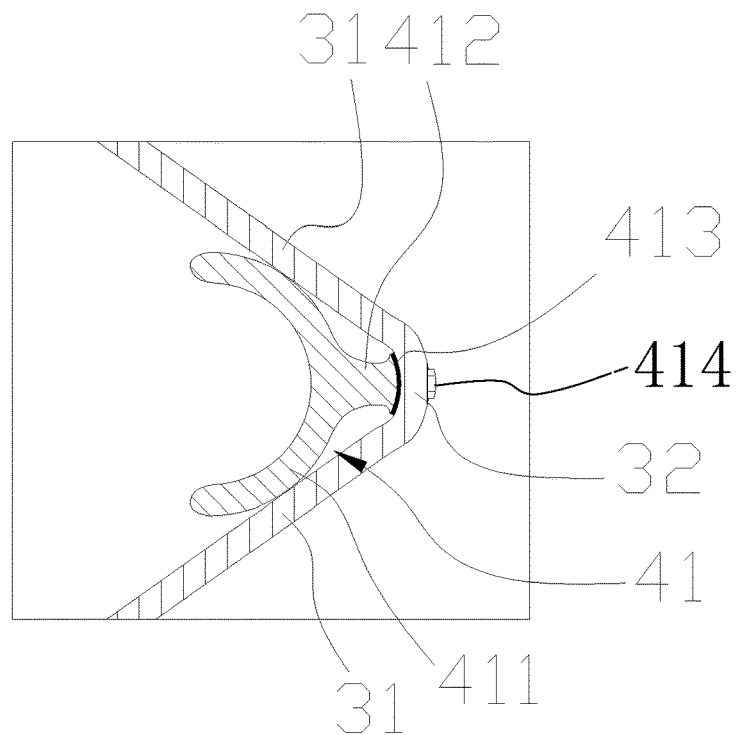
FIG. 8 is an enlarged view of part F of FIG. 7.
Figure 9:
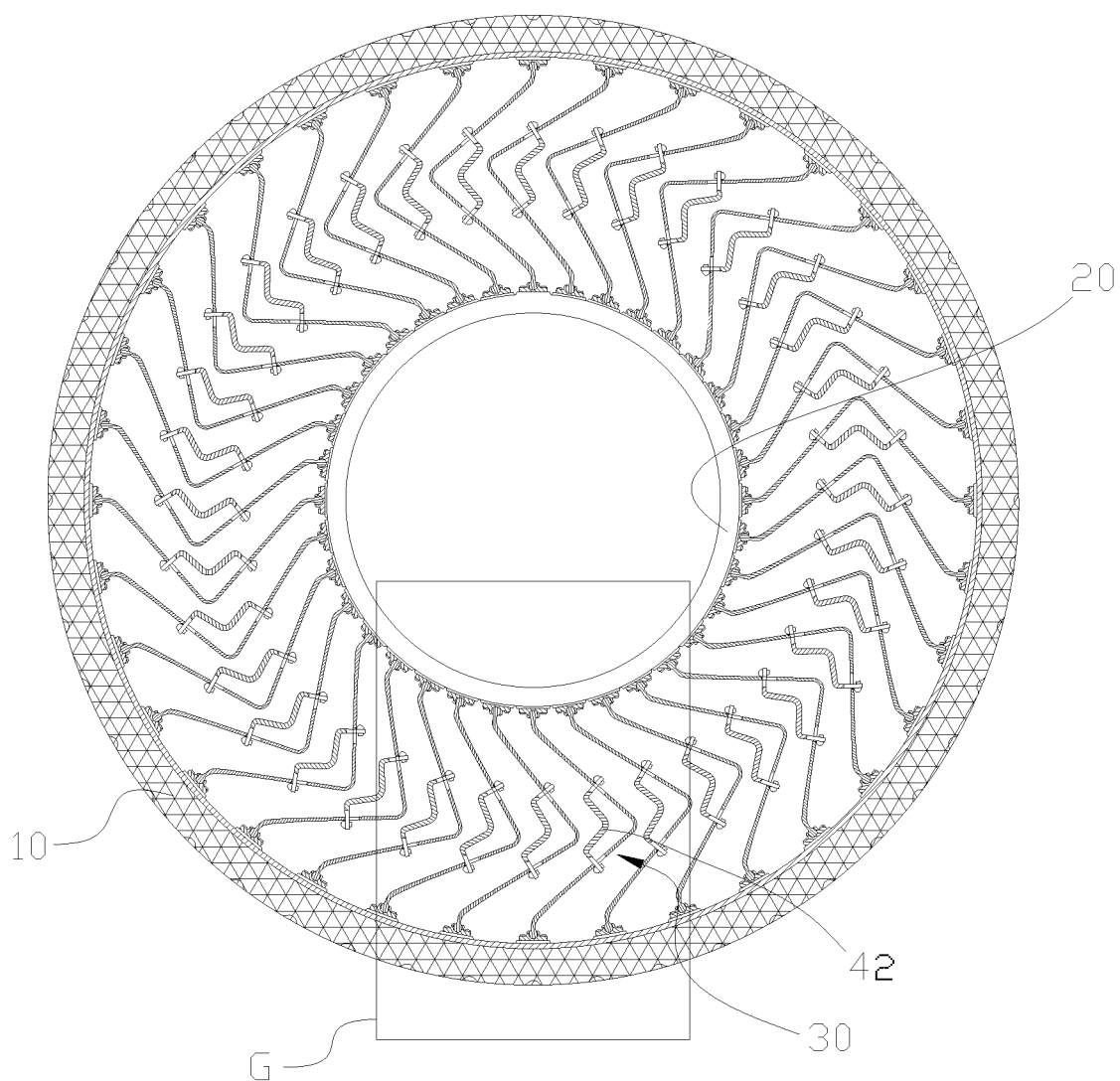
FIG. 9 is a structural diagram of a non-pneumatic tire according to Embodiment 2 of the present invention (in the case where the tire is less impacted by the ground).
Figure 10:
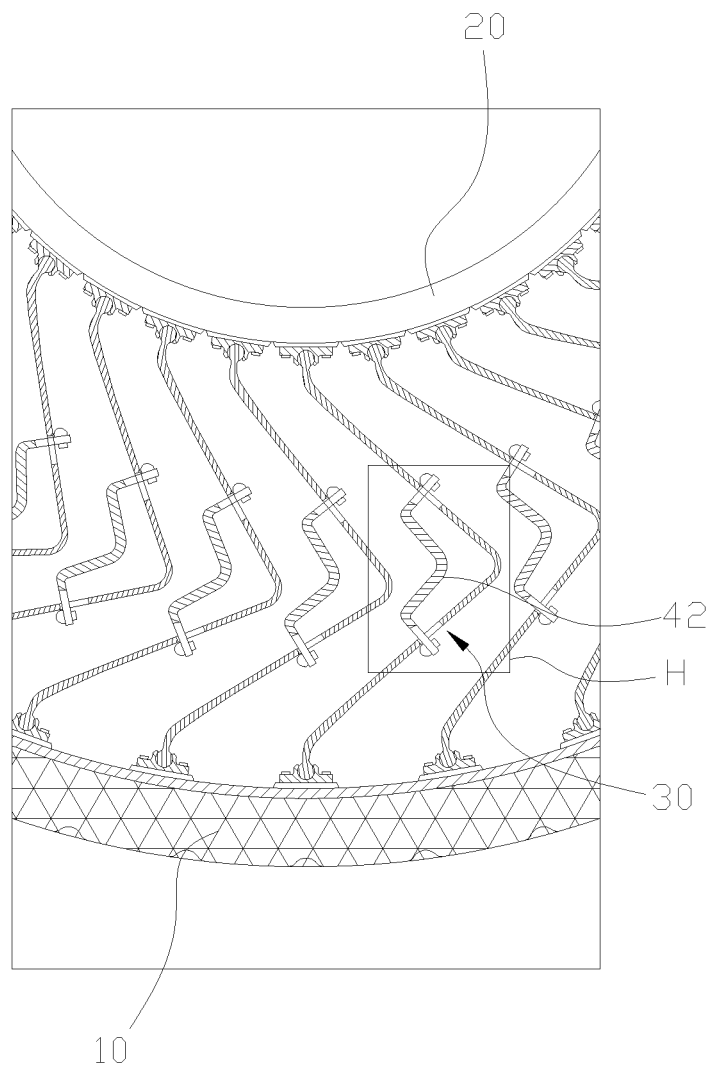
FIG. 10 is an enlarged view of part G of FIG. 9.
Figure 11:
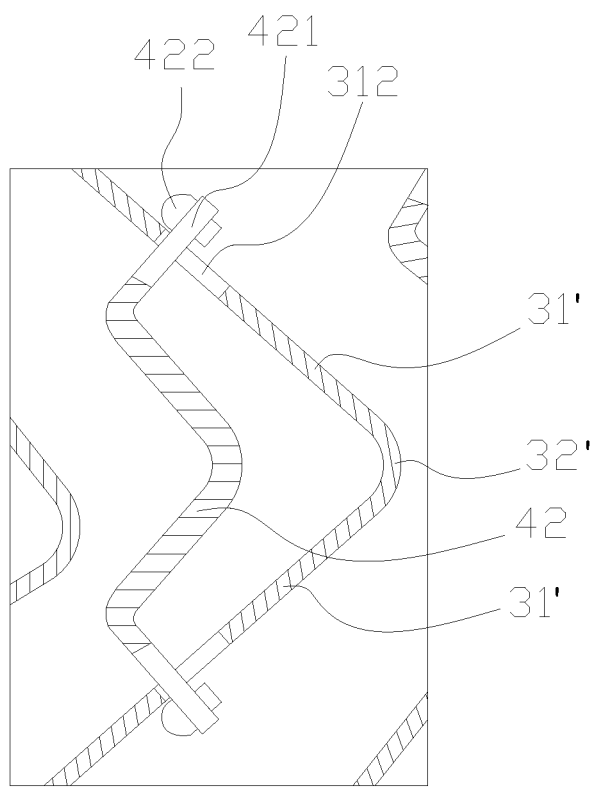
FIG. 11 is an enlarged view of part H of FIG. 10.
Figure 12:
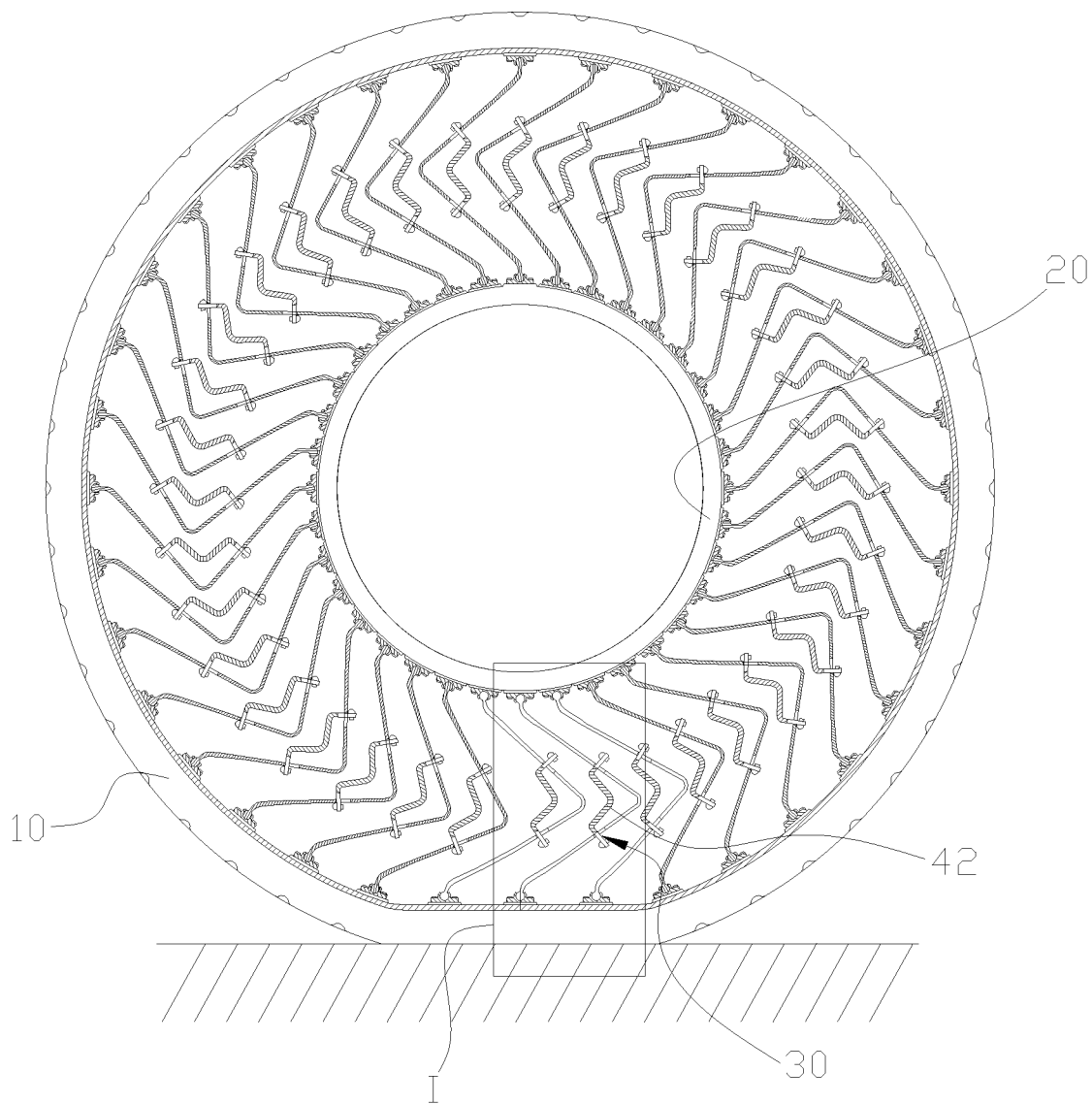
FIG. 12 is a structural diagram of a non-pneumatic tire according to Embodiment 2 of the present invention (in the case where the tire is greatly impacted by the ground).

As can be seen from the above, when the tire is greatly impacted by the ground and the apex corner area 32 of the spokes 30 may undergo plastic deformation, as shown in FIG. 8, the tile-shaped body 411 prevents the included angle between the two inclined plates 31 from being reduced to a predetermined included angle, thereby restricting the apex corner area 32 of the spokes 30 from yielding deformation, thereby avoiding plastic deformation of the apex corner area 32.

It should be noted that the elastic modulus of the tile-shaped body 411 is made greater than the elastic modulus of the spokes 30.

In this embodiment, the purpose of applying the rubber layer 413 to the end of the connection portion 412 of the resistance part 41 is to: the rubber layer 413 is deformed in real time so that the end of the connection portion 412 is always matched with the inner side of the apex corner area 32, thereby minimizing the influence of the connection portion 412 on the elastic deformation of the apex corner area 32, so that the elastic deformation characteristics of the spoke 30 will not be greatly affected due to the provision of the resistance part 41.

Embodiment 2

As shown in FIGS. 9 to 13, in this embodiment, the resistance part 42 includes a V-shaped bent plate and a plurality of sliders 421 formed at both ends of the bent plate and arranged in width; the two inclined plates 31' of the spoke 30 are provided with sliding grooves penetrating through the thickness, and the sliders 421 penetrate through the sliding grooves. The end portion of the slider 421 is detachably connected with a limiting part 422 for restricting the slider 421 from disengaging from the sliding groove of the inclined plate 31'. The relationship between the resistance part 42 and the spoke 30 is arranged such that when the included angle of the two inclined plates 31' of the spoke 30 is reduced to a preset included angle, the two inclined plates 31' come into contact with the bent plate so that the bent plate generates resistance against the two inclined plates 31' to increase the resistance of the whole of the spoke 30.

Figure 13:
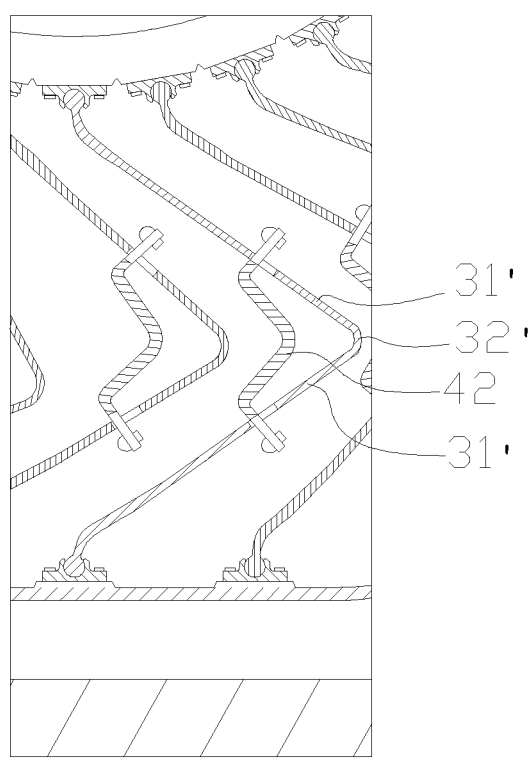
FIG. 13 is an enlarged view of part I of FIG. 12.

From the foregoing, as shown in FIG. 13, when the tire is greatly impacted by the ground and may cause plastic deformation of the apex corner area 32' of the spokes 30, the V-shaped bent plate increases the stiffness of the spokes 30 through contact with the spokes 30, so that the spokes 30 have greater stiffness to prevent the included angle of the inclined plate 31' from further decreasing.

The resistance part 42 of this embodiment differs from the resistance part 41 of Embodiment 1 in a number of ways in preventing plastic deformation of the apex corner area 32 or 32' of the spoke 30.

In Embodiment 1, when the spoke 30 comes into contact with the resistance part 41, the included angle between the two inclined plates 31 of the spoke 30 does not decrease, while in Embodiment 2, when the spoke 30 comes into contact with the resistance part 42, the included angle between the two inclined plates 31' of the spoke 30 continues to decrease by a range, however, the decrease stops again, and after the contact with the inclined plate 31', the rigidity of the spoke 30 against deformation increases. Therefore, the preset angle setting in the present embodiment 2 is larger than the preset angle in the embodiment 1.

By adding the resistance parts 41 and 42, the invention can effectively avoid plastic permanent deformation of the spokes 30, and further can prolong the service life of the non-pneumatic tire.

We claim:

1. A non-pneumatic tire, characterized by comprising:
    wheel hub;
    an annular belt, located on the periphery of the wheel hub;
    a plurality of spokes circumferentially arranged between the annular belt and the wheel hub; each spoke being V-shaped, and the spoke comprising two inclined plates arranged at an included angle and an arc-shaped apex corner area formed at the joint of the two inclined plates;
    a resistance part for limiting the deformation amount of the apex corner area to a deformation amount corresponding to the yield strength,
    wherein the resistance part is located between two said inclined plates; the resistance part is used for applying reaction force to the two inclined plates when the included angle of the two inclined plates is smaller than a preset included angle, the resistance part comprises a tile-like body having an arc-shaped surface and a connection portion integrally formed with the tile-like body, an end part of the connection portion away from the tile-shaped body has an arc-shaped surface matched with an inner side of the apex corner area, and the end part of the connection portion is attached to the inner side of the apex corner area and connected to the apex corner area by a fastener passing through the arc part; wherein:

the arc-shaped surface of the tile-shaped body faces the two inclined plates, and the connection portion makes the tile-shaped body away from the apex corner area;

when the included angle of the two inclined plates becomes smaller than the preset included angle, the position of the two inclined plates away from the apex corner area contacts the arc-shaped surface of the tile-shaped body, so that the tile-shaped body exerts a reaction force on the two inclined plates.

2. The non-pneumatic tire according to claim 1, characterized in that a rubber layer is attached to an end of the connection portion of the resistance part.

3. The non-pneumatic tire of claim 1, characterized in that each of the spokes has two ends respectively connected to the annular belt and to the wheel hub by means of an embedding part; wherein:

a strip body with a circular cross section is formed at each of the two ends of the spoke, the embedding part is provided with a guide groove with a circular cross section, and the strip body extends into the guide groove from an end of the guide groove so that the spoke can rotate relative to the embedding part, and the embedding part is fixed to the annular belt and the wheel hub by means of a fastener.

4. A non-pneumatic tire, characterized by comprising:
wheel hub;
an annular belt, located on the periphery of the wheel hub;
a plurality of spokes circumferentially arranged between the annular belt and the wheel hub; each spoke being V-shaped, and the spoke comprising two inclined plates arranged at an included angle and an arc-shaped apex corner area formed at the joint of the two inclined plates;
a resistance part for limiting the deformation amount of the apex corner area to a deformation amount corresponding to the yield strength,
wherein the resistance part is located between two said inclined plates; the resistance part is used for applying reaction force to the two inclined plates when the included angle of the two inclined plates is smaller than a preset included angle,
the resistance part comprises a V-shaped bent plate and a plurality of sliders formed at both ends of the bent plate and arranged in width; the two inclined plates of the spoke are provided with sliding grooves penetrating through the thickness, and the sliders penetrate through the sliding grooves; wherein:
when the included angle of the two inclined plates of the spoke becomes smaller than the preset included angle, the two inclined plates contact with the bent plates so that the bent plates apply a reaction force to the two inclined plates.

5. The non-pneumatic tire according to claim 4, characterized in that an end of the slider is provided with a limiting part for restricting the slider from disengaging from the sliding groove of the inclined plate.

* * * * *